United States Patent
Martin et al.

(10) Patent No.: US 10,337,384 B2
(45) Date of Patent: Jul. 2, 2019

(54) SYSTEM AND METHOD FOR DETERMINING EXHAUST TEMPERATURE

(71) Applicant: Ford Global Technologies, LLC, Dearborn, MI (US)

(72) Inventors: Douglas Raymond Martin, Canton, MI (US); Benjamin M. Rocci, Plymouth, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 527 days.

(21) Appl. No.: 15/054,529

(22) Filed: Feb. 26, 2016

(65) Prior Publication Data

US 2017/0248061 A1 Aug. 31, 2017

(51) Int. Cl.
*F01N 3/00* (2006.01)
*F01N 11/00* (2006.01)
(Continued)

(52) U.S. Cl.
CPC .......... *F01N 11/002* (2013.01); *F01N 11/005* (2013.01); *F01N 13/008* (2013.01); *F02D 41/107* (2013.01); *F02D 41/1441* (2013.01); *F02D 41/1446* (2013.01); *F02D 41/1447* (2013.01); *F02D 41/1454* (2013.01); *F02D 41/1456* (2013.01); *F02D 41/1494* (2013.01); *F02D 41/222* (2013.01); *F02D 41/2474* (2013.01); *F01N 2430/00* (2013.01); *F01N 2560/025* (2013.01); *F01N 2560/06* (2013.01); *F01N 2560/20* (2013.01); *F01N 2900/08* (2013.01); *F01N 2900/1404* (2013.01); *F01N 2900/1602* (2013.01); *F02D 2200/501* (2013.01); *Y02T 10/40* (2013.01); *Y02T 10/47* (2013.01)

(58) Field of Classification Search
CPC .... F01N 11/002; F01N 13/008; F02D 41/222; F02D 41/1446; F02D 41/107
USPC .......................................................... 60/274
See application file for complete search history.

(56) References Cited

U.S. PATENT DOCUMENTS 5,740,675 A * 4/1998 Shimasaki ............ F01N 3/2013
123/697
5,832,721 A * 11/1998 Cullen ............... B01D 53/9495
60/274
(Continued)

OTHER PUBLICATIONS

Martin, Douglas Raymond et al., "System and Method for Determining Exhaust Temperature," U.S. Appl. No. 14/725,564, filed May 29, 2015, 32 pages.

*Primary Examiner* — Jason D Shanske
(74) *Attorney, Agent, or Firm* — Julia Voutyras; McCoy Russell LLP (57) ABSTRACT

Methods and systems are provided for accurately inferring an exhaust temperature during steady-state and transient vehicle operation based on the duty cycle of an exhaust gas sensor heating element. A steady-state temperature is inferred based on an inverse of the duty cycle, and then adjusted with a transfer function that compensates for transients resulting from changes in vehicle speed, and load, and for the occurrence of tip-in and tip-out events. The inferred temperature can also be compared to a modeled temperature to identify exhaust temperature overheating conditions, so that mitigating actions can be promptly performed.

16 Claims, 7 Drawing Sheets

(51) Int. Cl.
*F01N 13/00* (2010.01)
*F02D 41/14* (2006.01)
*F02D 41/22* (2006.01)
*F02D 41/10* (2006.01)
*F02D 41/24* (2006.01)

(56) References Cited

U.S. PATENT DOCUMENTS

| | | | |
|---|---|---|---|
| 5,956,941 A * | 9/1999 | Cullen | B01D 53/9495 60/274 |
| 6,294,075 B1 | 9/2001 | Poggio et al. | |
| 6,371,097 B1 | 4/2002 | Rossi | |
| 6,679,238 B2 | 1/2004 | Nebiyeloul-Kifle et al. | |
| 7,523,653 B2 | 4/2009 | Smith et al. | |
| 7,841,769 B2 | 11/2010 | Ma et al. | |
| 8,136,343 B2 * | 3/2012 | Zawacki | F02D 41/1494 60/274 |
| 8,152,369 B2 | 4/2012 | Ma et al. | |
| 2003/0154708 A1 * | 8/2003 | Yasui | F01N 3/101 60/274 |
| 2006/0117737 A1 | 6/2006 | Ohsaki | |

* cited by examiner

SYSTEM AND METHOD FOR DETERMINING EXHAUST TEMPERATURE

FIELD

The present application pertains to systems and methods for accurately determining an engine exhaust temperature and adjusting engine operation in accordance.

BACKGROUND/SUMMARY

It may be desirable to accurately determine exhaust temperatures of an engine. By determining engine exhaust temperatures, it may be possible to provide mitigating actions when exhaust temperatures are higher than is desired. Further, determining exhaust temperatures may be useful for assessing operation of exhaust after-treatment devices. One way to determine exhaust temperatures is to install thermocouples, thermistors, or other temperature sensors in an exhaust passage that directs engine combustion by-products to exhaust after treatment devices. However, the thermocouples or thermistors may degrade if they are exposed to higher exhaust temperatures. Further, performance of exhaust temperature sensors may degrade if acidic combustion byproducts accumulate on the temperature sensors. This can result in the need for frequent replacement of temperature sensors, and related warranty issues.

Another example approach for determining exhaust temperatures involves inferring the exhaust temperature based on a heating element. For example, as shown by Ma et al. in U.S. Pat. No. 8,152,369, the resistance of a heating element coupled to an exhaust gas sensor may be used for exhaust temperature estimation. Therein, a change in the resistance of a heater that is used for maintaining the temperature of a sensing element of the exhaust gas sensor (e.g., a universal exhaust gas oxygen sensor or UEGO) is leveraged for estimating the exhaust temperature.

However, the inventors have recognized potential issues with such an approach. As one example, exhaust temperature estimation may be delayed due to the slow time response of the heater circuit. As another example, a heat shield may be required for the sensor, adding hardware requirements. As yet another example, using the heating element for sensing element temperature control and for exhaust temperature estimation may require complex control algorithms that are computationally intensive. Even if the heating element were used, accurate exhaust temperature estimation requires steady-state engine operation for an extended period of time. In particular, transients can cause sudden temperature changes at the exhaust pipe and exhaust sensor, which affect the heating element current. However, these temperature may not correlate with changes in the exhaust temperature. For example, transients can result in catalyst and sensor cooling which result in additional catalyst heater operation for sensor temperature maintenance. This would incorrectly suggest a drop in the exhaust temperature. Even if there are small inaccuracies in exhaust temperature estimation, they can result in large errors in engine operation. For example, if engine operation were adjusted based on the underestimated exhaust temperature, exhaust over-heating could result. As such, this narrows the window of operating conditions where the exhaust temperature can be accurately determined. Therefore, it may be desirable to determine engine exhaust temperatures in a way that reduces the possibility of sensor degradation. Further, it may be desirable to determine exhaust temperatures in a way that is accurate and dynamic such that rapid changes in exhaust temperatures may be accurately observable.

The inventors herein have recognized the above-mentioned disadvantages and have developed a method for an engine, comprising: inferring a composite transient exhaust temperature based on a duty cycle of an exhaust gas sensor heating element and further based on vehicle conditions during transient vehicle operation, the vehicle conditions including engine load, vehicle speed, and modeled exhaust flange temperature; and adjusting engine operation based on the transient composite exhaust temperature. In this way, exhaust temperature can be estimated reliably over a larger range of engine operating conditions using existing engine hardware.

As one example, the duty cycle of a heater coupled to an exhaust gas oxygen sensor (such as a UEGO sensor coupled upstream of an exhaust catalyst or a CMS sensor coupled downstream of the exhaust catalyst) may be captured during vehicle operation. This includes data captured during steady-state vehicle operation as well as transient vehicle operation. As such, the heater is operated to maintain the temperature of the exhaust gas sensor at an operating temperature. Thus, during conditions when the exhaust temperature is low, the duty cycle of the heater may increase to provide sufficient heat to warm the sensor. In contrast, during conditions when the exhaust temperature is high, the duty cycle of the heater may decrease since the exhaust provides sufficient heat to warm the sensor. An engine controller may convert an inverse of the captured duty cycle into a steady-state exhaust temperature. Then, a composite transient exhaust temperature may be determined that compensates for exhaust temperature changes arising from vehicle conditions during transient vehicle operation, such as the transient changes in vehicle speed, engine load, the occurrence of tip-in and tip-out events, and changes in a modeled exhaust flange temperature. For example, the controller may use a transfer function (e.g., a multiplier) to convert the inverse of the duty cycle into the steady-state temperature, and then ramp in a transient adjustment, wherein both an amount of the transient adjustment as well as a ramping rate is based on the engine load, vehicle speed, and modeled exhaust flange temperature. As an example, the rate of ramping may be decreased as the vehicle speed increases to compensate for a drop in exhaust pipe temperature (which requires heater operation) which does not correlate with a corresponding drop in exhaust temperature. As another example, the ramping rate may be decreased during a tip-in and increased during a tip-out to compensate for the different effects of the transient events on the exhaust temperature. Likewise, the ramping rate may be adjusted to compensate for load changes. The composite transient exhaust temperature may then be used for adjusting engine operations, such as to mitigate exhaust overheating. As one example, if the composite transient exhaust temperature is elevated, an engine load may be limited to reduce peak exhaust temperatures.

In this way, by estimating exhaust temperature via a heater of an oxygen sensor, it may be possible to provide the technical result of measuring exhaust temperature using existing hardware. Further, by compensating for changes incurred during transient vehicle operation to the heater operation that are distinct from changes to the exhaust temperature, the accuracy of exhaust temperature measurements may be improved. Consequently, it may be possible to provide over-temperature mitigating actions in a timely manner, and reduce engine warranty issues.

The present description may provide several advantages. Specifically, the approach may improve exhaust gas temperature estimates. Additionally, the approach may reduce exhaust gas temperature sensor degradation. Further, the approach may compensate for exhaust temperature sensor changes that occur over time, instead of one time sensor compensation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
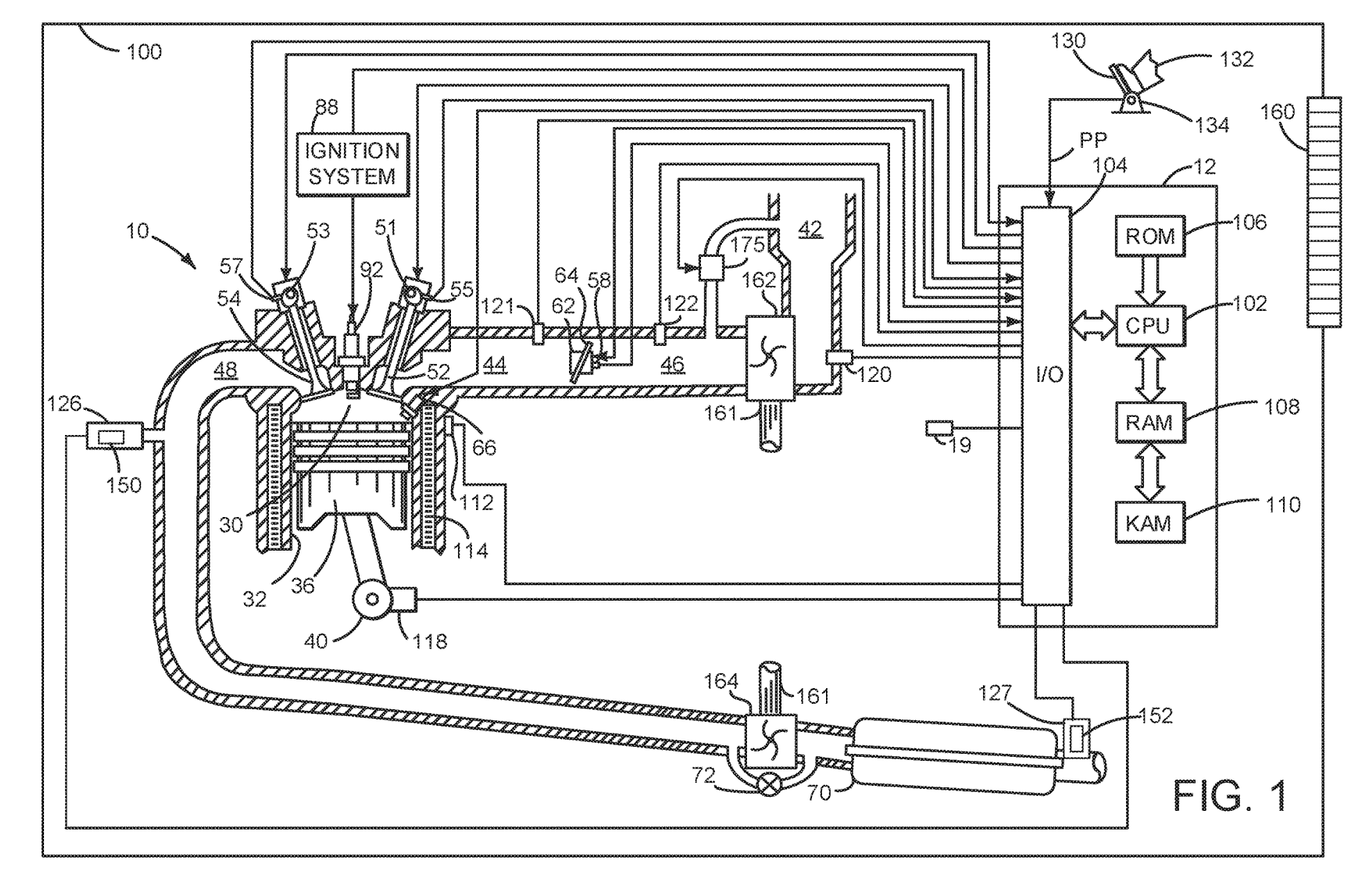
FIG. 1 shows a schematic depiction of an engine including exhaust gas oxygen sensors.
Figure 5:
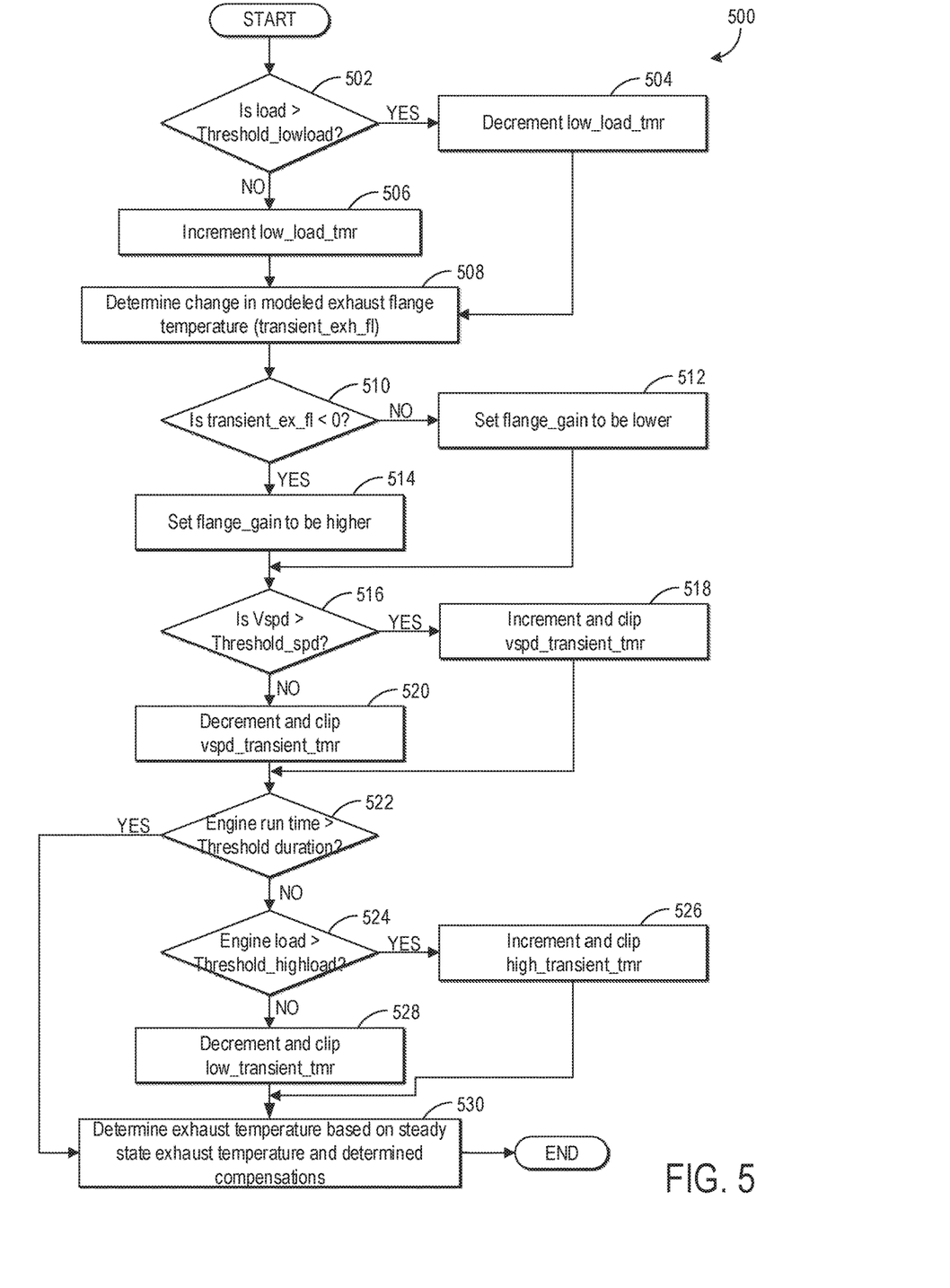
FIG. 5 shows an example transient compensation that may be used for determining the composite transient exhaust temperature.
Figure 6:
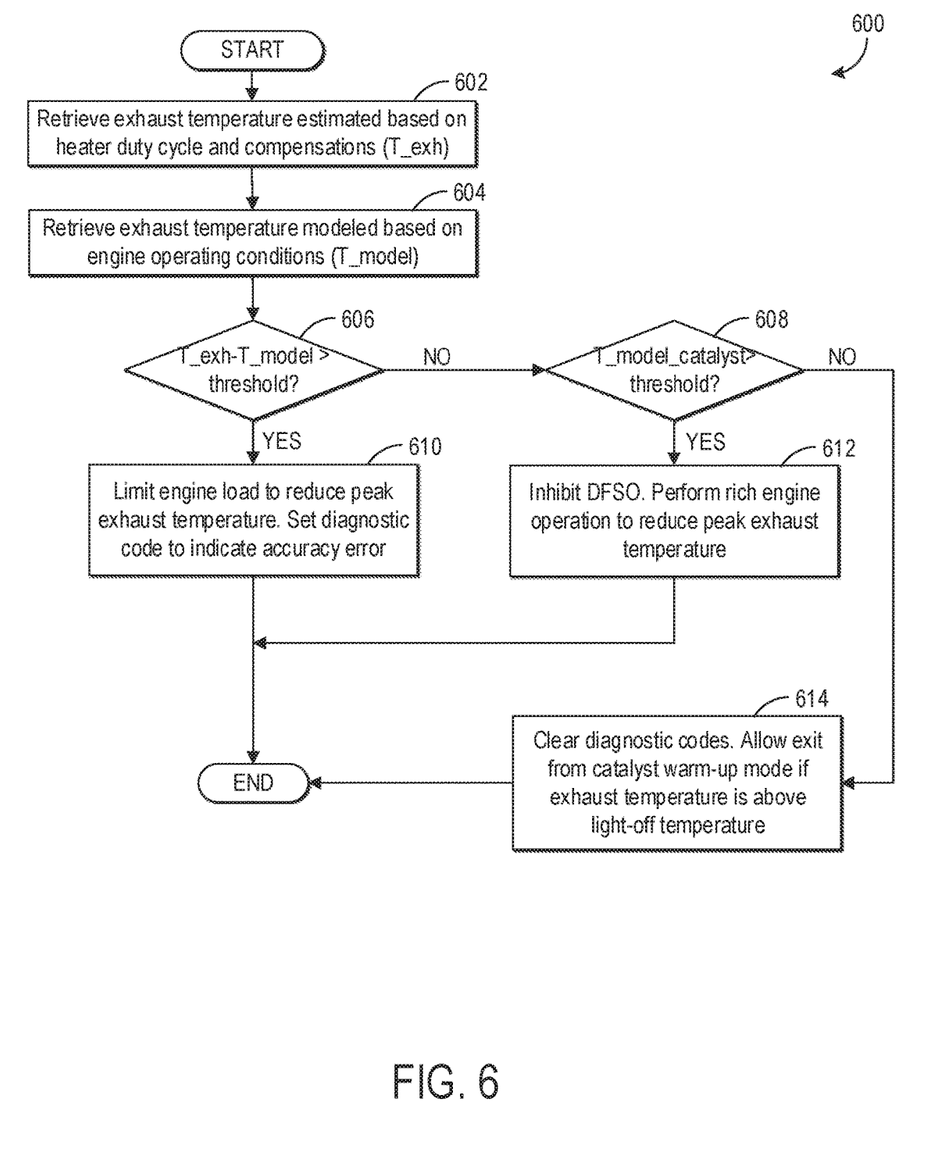
FIG. 6 shows an example method for diagnosing exhaust over-temperature based on the determined composite transient exhaust temperature.

The present description is related to determining temperatures in an engine exhaust system, such as the engine system of FIG. 1. Exhaust temperature measurement may be performed based on the duty cycle of a heater coupled to the exhaust gas sensor of the engine system (FIG. 2), and further based on anticipated excursions resulting from transient vehicle operation (FIG. 3). A controller may be configured to perform a control routine, such as the example routine of FIGS. 4-5 to infer a composite transient exhaust temperature based on an inverse of the heater's duty cycle and further based on vehicle conditions during the transient operation, such as based on changes in vehicle speed, engine load, and accelerator pedal position. In addition, the controller may diagnose the engine based on differences between the estimated composite transient exhaust temperature and a modeled exhaust flange temperature (FIG. 6). Example exhaust temperature adjustments and excursions due to varying vehicle conditions during transient operation are shown with reference to FIGS. 7-10.

Referring to FIG. 1, internal combustion engine 10, comprising a plurality of cylinders, one cylinder of which is shown in FIG. 1, is controlled by electronic engine controller 12. Engine 10 may be coupled in a propulsion system, such as an on-road vehicle 100. In particular, engine 10 may be located in an under-hood compartment (not shown) at a front end of vehicle 100. Vehicle 100 may be configured with a grill shutter system 160 coupled to front end of the vehicle. The grill shutter system 160 may comprise a plurality of grills and louvers whose position may be adjusted via an engine controller to vary an ambient airflow directed through an under-hood compartment of the vehicle. For example, an engine controller may send a signal to an actuator to move the plurality of grills and/or louvers to a more open position to increase airflow through the under-hood compartment during selected conditions, such as to increase cooling. During other conditions, the engine controller may send a signal to the actuator to move the plurality of grills and/or louvers to a more closed position to decrease airflow through the under-hood compartment (such as to reduce aerodynamic drag).

Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width provided from controller 12. Fuel is delivered to fuel injector 66 by a fuel system including a fuel tank (not shown), fuel pump (not shown), and fuel rail (not shown). In addition, intake manifold 44 is shown communicating with optional electronic throttle 62 which adjusts a position of throttle plate 64 to control air flow from intake boost chamber 46.

Compressor 162 draws air from air intake passage 42 to supply boost chamber 46. Exhaust gases spin turbine 164 which is coupled to compressor 162 via shaft 161. Compressor bypass valve 175 may be electrically operated via a signal from controller 12. Compressor bypass valve 175 allows pressurized air to be circulated back to the compressor inlet to limit boost pressure. Similarly, waste gate actuator 72 allows exhaust gases to bypass turbine 164 so that boost pressure can be controlled under varying operating conditions.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. A second exhaust gas oxygen sensor 127 (herein also referred to as catalyst monitor sensor or CMS) is shown downstream of turbine and emissions device 70 according to a direction of exhaust gas flow.

Converter 70 can include multiple catalyst bricks, in one example. In another example, multiple emission control devices, each with multiple bricks, can be used. Converter 70 can be a three-way type catalyst in one example.

In one example, UEGO sensor 126 located upstream of the catalyst is configured to identify air-fuel imbalances that will result in inaccurate burning of fuel at a face of a first brick of the catalyst. CMS sensor 127 located downstream of the catalyst is configured to infer air-fuel imbalances that result from inaccurate burning of fuel at the face of a second brick of the catalyst. As such, the exhaust gas received at the CMS sensor tends to be hotter than the exhaust gas received at the UEGO sensor.

UEGO sensor 126 may include a resistive heating element 150 (herein also referred to as a sensor heater) for providing thermal energy to heat an oxygen sensing element (not shown) of oxygen sensor 126 when sensor 126 is in use. Likewise, CMS sensor 127 may include a resistive heating element 152 (herein also referred to as a sensor heater) for providing thermal energy to heat an oxygen sensing element (not shown) of oxygen sensor 127 when sensor 127 is in use. In particular, heating elements 150, 152 enable UEGO sensor 126 and CMS sensor 127, respectively, to be maintained at a desired operating temperature (such as at 700° C.). For example, the duty cycle of the heating element may be adjusted in response to an error between a desired operating temperature (of set-point) of the sensor and an actual temperature of the sensor (which may be estimated or inferred). In one example, the resistance of resistive heating elements 150, 152 may vary between 2 and 20 ohms depending on temperature at a location in the exhaust system where oxygen sensor 126 is placed.

Figure 2:
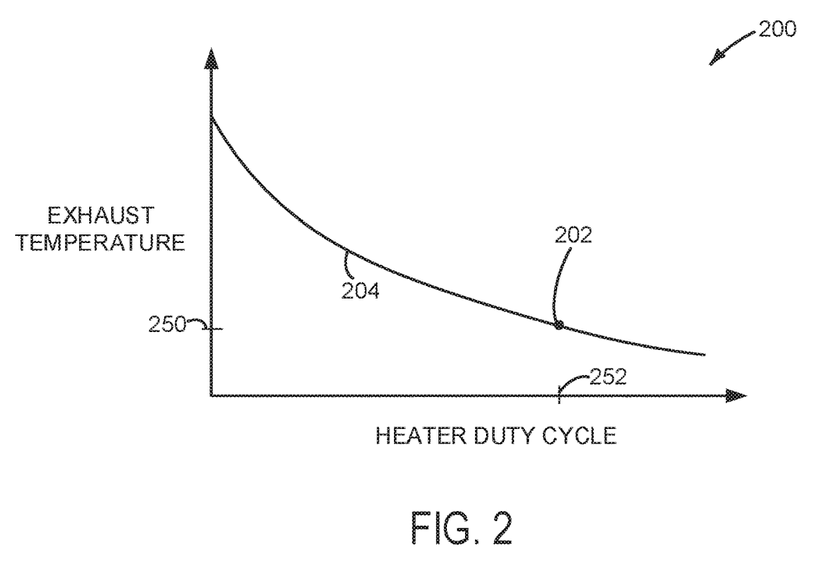
FIG. 2 shows a graphical relationship between the duty cycle of an exhaust gas oxygen sensor heater and estimated exhaust temperature.
Figure 3:
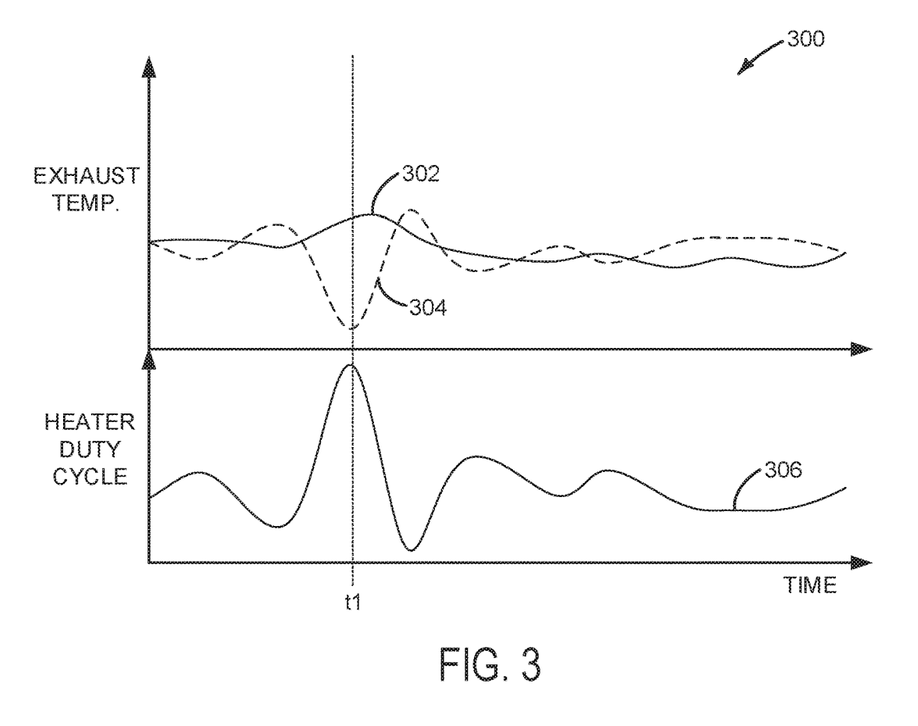
FIG. 3 shows an example of excursions in estimated exhaust temperature during transient vehicle operation.

As such, a duty cycle of heating elements 150, 152 may correlate with exhaust temperature, at least during steady-state vehicle operation, as shown at FIG. 2. Plot 200 of FIG. 2 depicts an oxygen sensor heating element duty cycle (along the x-axis) versus inferred exhaust temperature (along the y-axis). Temperature 250 represents a first temperature and duty cycle 252 represents a first pulse-width that corresponds to location 202 on curve 204. Curve 204 shows the relationship between the heater element duty cycle and inferred exhaust temperature. Thus, it may be observed that as the duty cycle increases (that is, as the current directed through the heater increases), the inferred exhaust temperature may drop. This is because the heater is operated to maintain the temperature of the exhaust gas sensor. Thus, during conditions when the exhaust temperature is low, the duty cycle of the heater may increase to provide sufficient heat to warm the sensor. In contrast, during conditions when the exhaust temperature is high, the duty cycle of the heater may decrease since the exhaust provides sufficient heat to warm the sensor and additional heating via the heater is not required. An engine controller may therefore convert an inverse of the captured duty cycle into a steady-state exhaust temperature.

However, during transient vehicle conditions, such as when the vehicle is travelling at higher speeds, and during extended accelerator pedal tip-in and tip-out events, there may be significant excursions in the inferred exhaust temperature. Likewise, excursions may occur during operation of the louvers and grills of grill shutter system 160. This may be due to sudden temperature changes at the exhaust pipe and exhaust sensor triggered by the transient, which affect the heating element current. However, these temperature changes may not correlate with changes in the actual exhaust temperature.

An example of this excursion is depicted with reference to plot 300 of FIG. 3. Therein, curve 302 depicts an actual exhaust temperature, as would be estimated by an exhaust temperature sensor. This is compared to curve 304 that depicts an inferred exhaust temperature which is based on the duty cycle of a heater, depicted at plot 306. All curves are plotted over time of vehicle operation. Prior to t1, the vehicle may be operating under steady-state conditions. At t1, the vehicle may undergo a transient, such as due to an increase in vehicle speed, or an extended tip-out. Due to the transient, there may be catalyst and sensor cooling at the exhaust passage which necessitates additional catalyst heater operation for sensor temperature maintenance. This is depicted by the spike in heater duty cycle at t1. However, based on this additional heater operation, an exhaust temperature may be incorrectly underestimated at t1. If an engine controller operates the engine responsive to the exhaust temperature inferred at t1 and raises the actual exhaust temperature, exhaust over-heating could result. As such, even small excursions in exhaust temperature estimation can cause significantly larger errors in engine operation.

In view of the above, the inventors herein have developed an approach for being able to use the heater duty cycle data for accurate exhaust temperature estimation by taking into account temperature fluctuations caused by vehicle transients. The method, detailed at FIGS. 4-5, determines an adjustment to a duty cycle based exhaust temperature based on expected fluctuations and adjusts a ramping in of the adjustment based on the transients. For example, an absolute amount of the adjustment as well as a rate of ramping in of the adjustment is adjusted based on transients such as change in vehicle speed, engine load, accelerator pedal position, and (estimated or modeled) exhaust flange temperature. As such, during the transient compensations, the duty cycle of the UEGO sensor heater may continue to be adjusted based on the error between the desired sensor temperature set-point and the actual temperature (as estimated or inferred).

Returning to FIG. 1, controller 12 is shown as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; atmospheric pressure from barometric pressure sensor 19; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Engine position sensor 118 produces a predetermined number of equally spaced pulses every revolution of the crankshaft from which engine speed (RPM) can be determined.

The controller 12 receives signals from the various sensors of FIG. 1 and employs the various actuators of FIG. 1 to adjust engine operation based on the received signals and instructions stored on a memory of the controller. Example actuators include fuel injector 66, intake throttle 64, as well as louvers and grills of grill shutter system 160. In one example, the controller captures the duty cycle of the heater of the exhaust gas sensor(s) and adjusts the fuel injector and the intake throttle responsive to an inferred composite transient exhaust temperature that is based at least on the duty cycle of the heater and transients incurred during vehicle operation.

Storage medium read-only memory 106 can be programmed with computer readable data representing instructions executable by processor 102 for performing the methods described below as well as other variants that are anticipated but not specifically listed. Example methods are described with reference to FIGS. 4-5.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

In this way, the system of FIG. 1 provides for an engine system, comprising an engine including an intake passage and an exhaust passage; an exhaust catalyst coupled to the engine exhaust passage; an exhaust gas oxygen sensor coupled upstream of the exhaust catalyst, the sensor including a heater for maintaining the sensor at an operating temperature; a fuel injector coupled to an engine cylinder; an intake throttle coupled to the engine intake passage; and a controller. The controller may be configured with computer readable instructions stored on non-transitory memory for: during vehicle operation, capturing a duty cycle of the heater; converting an inverse of the duty cycle into a first exhaust temperature estimate; learning a transfer function based on transients during the vehicle operation; calculating a second exhaust temperature estimate based on the first exhaust temperature estimate and the learned transfer function; and adjusting engine operation based on the second exhaust temperature estimate. The vehicle operation includes steady-state and transient vehicle operation. The transfer function is learned based on one or more of a change in vehicle speed, and a change in engine load during the transient vehicle operation. In some examples, the transfer function may also be learned based on a change in accelerator pedal position during the transient vehicle operation.

The controller may include further instructions for: indicating exhaust over-temperature conditions in response to a difference between the second exhaust temperature and a modeled exhaust temperature being higher than a threshold, the modeled exhaust temperature based on engine speed, engine load, and spark timing; and in response to the indicating, reducing an opening of the intake throttle to limit the engine load and enriching the engine.

Figure 4:
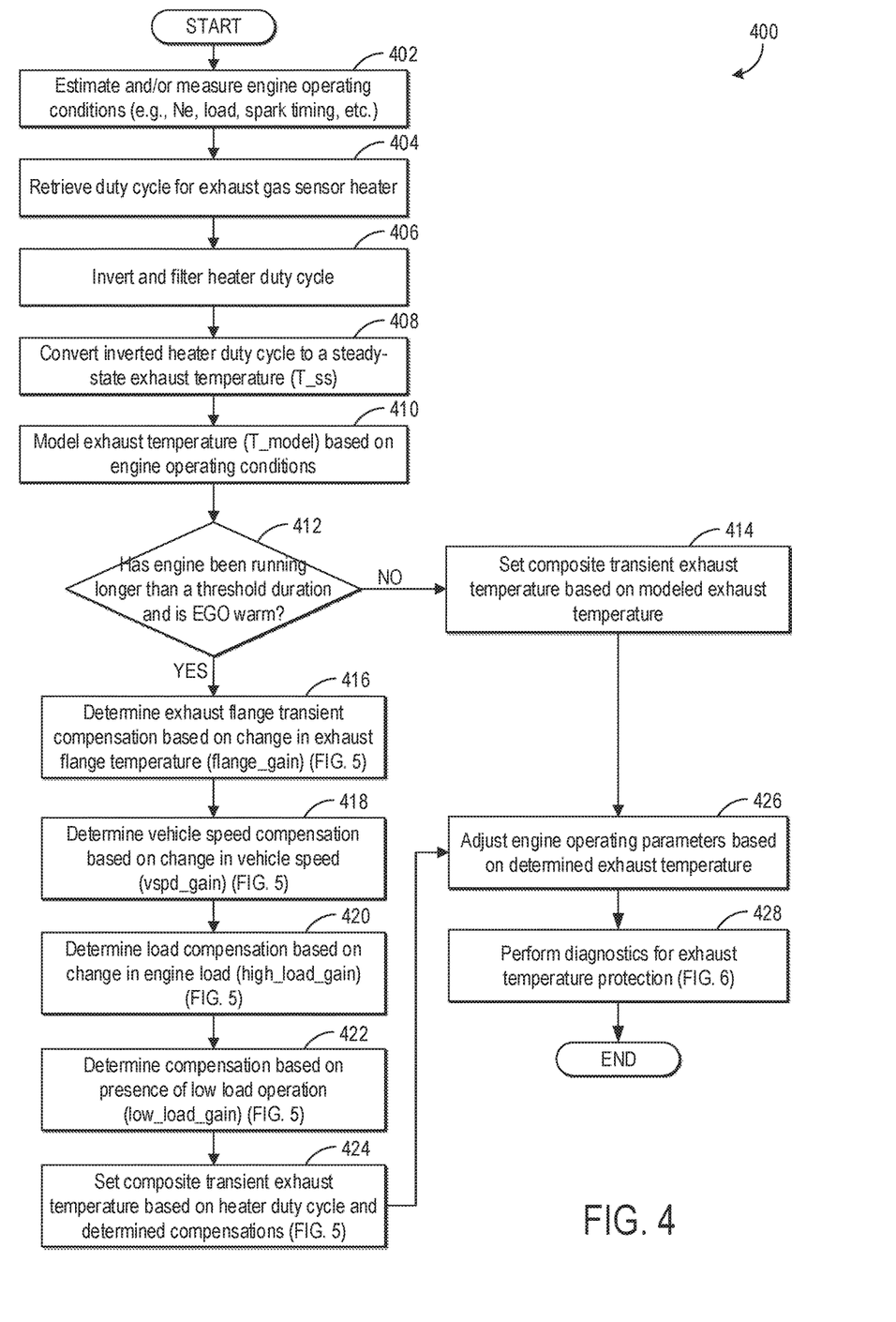
FIG. 4 shows an example method for determining a composite transient exhaust temperature during vehicle operation based on exhaust gas sensor heater operation.

Turning now to FIG. 4, an example routine 400 is shown for inferring a composite transient exhaust temperature based on the duty cycle of an exhaust gas sensor heating element, and further based on vehicle conditions during transient vehicle operation. At least portions of the method of FIG. 4 may be incorporated to controller 12 in the system of FIG. 1 as executable instructions stored in non-transitory memory. Further, portions of the method of FIG. 4 may be actions taken by controller 12 in the physical world to transform vehicle operating conditions. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 402, the method includes estimating and/or measuring vehicle and engine operating conditions. These include, for example, engine speed, engine load, ignition spark timing, vehicle speed, engine temperature, exhaust catalyst temperature, etc. At 404, the method includes retrieving a duty cycle for an exhaust gas sensor heater. The exhaust gas sensor may be one or more of a first exhaust gas oxygen sensor coupled upstream of an exhaust catalyst (such as an exhaust UEGO sensor, or sensor 126 of FIG. 1), and a second exhaust gas oxygen sensor coupled downstream of the exhaust catalyst (such as an exhaust CMS sensor, or sensor 127 of FIG. 1). In one example, the controller may select the duty cycle of the first exhaust gas oxygen sensor during a first condition, such as during steady engine operation. In another example, the controller may select the duty cycle of the second exhaust gas oxygen sensor during a second condition, such as during a hard acceleration. As such, if there is an exotherm in the cylinders due to improper combustion (such as due to combustion of air with unburned fuel in the exhaust), this exhaust may go past the first exhaust gas sensor and not burn at the first sensor, but burn at the exhaust catalyst. As a result, an exotherm may be more noticeable at the second exhaust gas sensor (since it is downstream of the exhaust catalyst brick). Thus, the second sensor may be more sensitive to exotherms resulting from incomplete combustion. However, while the downstream location may become hotter over time, during an initial warm-up phase, the upstream location may be hotter due to the thermal inertia of the catalyst bricks.

In still other examples, the controller may retrieve the duty cycle of heaters coupled to both the upstream and the downstream exhaust gas sensor. For example, the controller may select the duty cycle of each of the first and second exhaust gas oxygen sensors during a third condition, such as during low-load operation. It will be appreciated that if both sensors are selected, two separate exhaust temperature measurements are learned for the two distinct exhaust locations. As such, retrieving the duty cycle of the heater includes retrieving the raw (unadjusted) duty cycle data of the heater(s). At 406, the method includes inverting and filtering the captured duty cycle data (inverted_htr_dc_fil). For example, the controller may determine the inverse of the duty cycle and apply a low-pass filter to the signal to remove high frequency noise from large amplitude short duration duty cycle changes.

At 408, the method includes converting the inverted and filtered duty cycle data into a steady-state exhaust temperature estimate (T_ss). This includes applying a transfer function to convert the inverted, filtered duty cycle data into an exhaust temperature. In one example, the steady-state exhaust temperature is determined as:

$$T\_ss=(slope*inverted\_htr\_dc\_fil)+offset,$$

wherein slope is change in temperature per amount of change in duty, for example, 1333 and offset is the hypothetical value of the temperature at zero duty cycle, for example 300.

At 410, the method includes modeling an exhaust temperature (T_model) based on engine operating conditions. Herein, the modeled exhaust temperature is an expected exhaust temperature that is expected based on the vehicle and engine conditions, such as based on each of engine speed, engine load, air-fuel ratio and spark ignition timing. In one example, when the exhaust gas sensor heater is a heater coupled to the upstream exhaust gas sensor (that is, the UEGO sensor), the expected exhaust temperature is an expected or modeled exhaust flange temperature. In another example, when the exhaust gas sensor heater is a heater coupled to the downstream exhaust gas sensor (that is, the CMS sensor), the expected exhaust temperature is an expected or modeled exhaust catalyst brick temperature (e.g., a modeled light-off temperature of the first brick of the exhaust catalyst).

At 412, the method includes determining if the engine has been running for longer than a threshold duration and if the exhaust gas sensor is sufficiently warm. As an example, it may be determined if the engine has been running for longer than 65 seconds, and if the exhaust gas sensor is above an activation temperature (e.g., above 700° C.). By confirming that the engine has been running long enough, it may be determined that bias from a cold exhaust pipe has been removed from the measurement. Likewise, by confirming that the exhaust gas sensor is warm enough, it may be determined that the duty cycle is responding to changes in exhaust temperature to maintain sensor temperature, rather than doing its initial warm-up.

If the selected conditions are not confirmed, at 414, the method includes setting a composite transient exhaust temperature based on the modeled exhaust temperature. For example, the composite transient exhaust temperature used for adjusting engine operation may be set as a function of the modeled exhaust temperature (e.g., the exhaust flange temperature modeled based on engine speed, load, and spark timing). In one example, the composite transient exhaust temperature used for adjusting engine operation may be set as Exhaust temperature=T_model*0.63. Since the gas temperature at the flange is closest to the combustion chamber, the gas cools quickly with distance through exhaust pipes. Therefore, the temporary estimate uses a percentage of the flange temperature to estimate the temperature at downstream locations.

Upon setting the actual exhaust temperature, at 426, the method includes adjusting engine operating parameters on the determined (set) exhaust temperature. For example, engine fueling and engine aircharge levels may be adjusted based on the determined exhaust temperature to maintain exhaust temperatures within a threshold. At 428, a diagnostic routine, such as the example routine of FIG. 6, may be performed for exhaust temperature protection. Therein, overheating may be diagnosed and appropriate mitigating actions may be performed.

Returning to 412, if the selected conditions are met, the method proceeds to infer a composite transient exhaust temperature based on the heater duty cycle (that is, based on the steady-state temperature) and further based on vehicle conditions during transient vehicle operation, the vehicle conditions including one or more or each of engine load, vehicle speed, and exhaust flange temperature. Herein, the exhaust flange temperature includes an expected or modeled exhaust flange temperature (such as T_model) that is based on each of engine speed, engine load, air-fuel ratio and spark ignition timing. In addition, the composite transient exhaust temperature may be further based on an engine load (such as upon the occurrence of tip-in or tip-out events), and the operation of a grill shutter system. As elaborated below, after converting the inverse of the duty cycle of the sensor heater into a first exhaust temperature estimate via a transfer function, the controller may ramp in a transient adjustment, each of the transient adjustment and a rate of the ramping in based on the vehicle conditions during the transient operation (that is, the engine load, the vehicle speed, the flange temperature, etc.)

Specifically at 416, the method includes determining an exhaust flange transient compensation (flange_gain) based on an expected exhaust flange temperature excursion. As elaborated at FIG. 5, this includes determining if there is a transient change in expected exhaust flange temperature (transient_ex_fl), as well as determining if the flange transient is going up or down. In one example, a negative flange temperature transient may be expected responsive to decreasing load and RPM while a positive flange temperature transient may be expected responsive to increasing load and RPM.

After determining the flange transient compensation, at 418, the method proceeds to determine a vehicle speed compensation (vspd_gain) based on a change in vehicle speed during the transient vehicle operation. As elaborated at FIG. 5, this includes determining if the vehicle speed is increasing or decreasing, as well as determining if the vehicle speed is sufficiently high to cause localized cooling. A ramping rate of the transient compensation may then be adjusted in accordance. In addition to determining the vehicle speed compensation, the controller may also determine a transient compensation based the operation of a grill shutter system of the vehicle.

After determining the vehicle speed transient compensation, at 420, the method proceeds to determine an engine load compensation (load_gain) based on a change in engine load during the transient vehicle operation. As elaborated at FIG. 5, this includes determining if the engine load is low, nominal or high, as well as determining if engine is operating in a high load or low load region. A ramping rate of the transient compensation may then be adjusted in accordance.

After determining the engine load transient compensation, at 422, the method proceeds to determine a low-load compensation (down_gain) based on the presence of pedal tip-out or tip-in events. This may include all tip-in and tip-out events over vehicle operation. Alternatively, the compensation may be based on tip-in and tip-out events that are longer than a threshold duration, such as extended tip-ins or extended tip-outs. As elaborated at FIG. 5, the compensation includes differentiating the effect of extended tip-ins and extended tip-outs on exhaust temperature.

After determining the transient compensations at 416-422, the method proceeds to 424 to inferring the composite transient exhaust temperature based on the heater duty cycle and the learned transient compensations. As elaborated with reference to FIG. 5, this includes adjusting a steady-state temperature learned as a function of the inverse of the heater duty cycle with a transient adjustment that is ramped in based on an aggregate of the transient compensations. From there the method moves to 426 to adjust engine operating parameters based on the determined (set) exhaust temperature. For example, engine fueling and engine aircharge levels may be adjusted based on the determined exhaust temperature to maintain exhaust temperatures within a threshold. Then, at 428, a diagnostic routine, such as the example routine of FIG. 6, may be performed for exhaust temperature protection. Therein, overheating may be diagnosed and appropriate mitigating actions may be performed.

It will be appreciated that during the various transient compensation processing steps disclosed above (such as at 412-426), the duty cycle of the EGO sensor heater may continue to be adjusted based on an error between a desired sensor temperature set-point and an actual sensor temperature (as estimated or inferred). In other words, the duty cycle of the EGO sensor heater may continue to be controlled independent of the transient compensation. Turning now to FIG. 5, method 500 depicts example transient compensations that are based on vehicle conditions during transient operation. In particular, a controller may be able to anticipate and predict excursions in exhaust temperature (e.g., how much the temperature will change, whether the temperature will increase or decrease, as well as when the temperature will change) based on transient changes in vehicle conditions. By better predicting these excursions and compensating for them, exhaust temperatures may be modeled more accurately. A transient adjustment of a first exhaust temperature estimate that is based on the heater duty cycle, as well as a rate of ramping in the transient adjustment into the first exhaust temperature estimate may be based on the various transient compensations. For example, a gain factor and/or a transfer function may be adjusted to provide the desired rate of ramping in and the desired transient compensation.

At 502, it may be determined if the engine load is higher than a threshold load. As such, this may be a lower threshold load (Threshold_lowload) below which the engine may be determined to be operating in a low load region. In one example, it may be determined if the engine load is higher than 0.6. Herein, the load is defined as the ratio of air that is in each cylinder divided by the maximum amount of air that could be in the cylinder under standard conditions without boost. As such, a load of 1.0 would be the maximum in a naturally aspirated engine under standard conditions. If the engine load is higher than the threshold load, and the engine is not in the low load region, at 504 the method includes decreasing the ramp-in rate. For example, the controller may decrement a transfer function or gain factor (low_load_transient_tmr) associated with the low load transient compensation. In one example, the transfer function or gain factor may be decremented to zero (that is, the factor may be zeroed out) such that no low load compensation is required. The transfer function is mapped at medium load. So if the load is within the region, the transfer function does not need to be adjusted to account for either low or high conditions. If the engine load is lower than the threshold load, and the engine is determined to be in the low load region, at 506, the method includes ramping in more negative compensation. For example, the controller may increment the transfer function or gain factor (low_load_transient_tmr) associated with the low load transient compensation. The calibration effort would determine the gain of the low load compensation during warm or moderate ambient temperature. During extremely cold ambients, the gain may be observed to be different due to the increased effect of cold air cooling the exhaust pipe which is in contact with the sensor and would bias the duty cycle higher to maintain the sensor temperature. Therefore, the gain may be adjusted based on ambient temperature.

From each of 504 and 506, the method proceeds to 508. At 508, the method includes determining a change in the modeled exhaust flange temperature (modeled based on engine speed, load, and spark ignition timing). For example, it may be determined if there is a transient change in expected exhaust flange temperature (transient_ex_fl), as well as determining if the flange transient is going up or down. In one example, a negative flange temperature transient may be expected responsive to decreasing engine load and RPM while a positive flange temperature transient may be expected responsive to increasing load and RPM.

At 510, it may be determined if there is any negative transient in the expected exhaust flange temperature (that is, it may be determined if the expected exhaust flange temperature is decreasing). If not, then at 512, the method includes increasing the ramp-in rate. For example, the controller may increment transfer function or gain factor (flange_gain) associated with the flange transient compensation. The controller may set the flange gain to a preset higher value, such as to 0.75.

If it is determined that there are positive transients, then at 514, the method includes increasing the ramp-in rate. For example, the controller may increase transfer function or gain factor (flange_gain) associated with the flange transient compensation. The controller may set the flange gain to a different preset value, such as to 1.7. If it is determined that there are no substantial transients, and that the expected exhaust flange temperature is substantially at a steady-state, then at 512 and 514, the method includes decreasing the ramp-in rate since the flange transient would be near zero even when multiplied by the flange gain.

In one example, there may be negative transients during an brief operator accelerator pedal tip-out. Responsive to the tip-out, the controller may set the flange gain to the preset value, such as to 0.75. In another example, there may be positive transients during a brief operator accelerator pedal tip-in. Responsive to the tip-in, the controller may set the flange gain to the preset value, such as to 1.7. Thus, the rate of ramping may be increased responsive to the operator pedal tip-in event and decreased responsive to the operator pedal tip-out event. By setting the flange transient compensation gain to 1.7, the effect of the flange transient on the compensation can be larger dutring positive transients. Likewise, by setting the flange transient compensation to 0.75, the effect of the flange traniswent on the compensation can be smaller during negative transients. By applying a higher gain factor for the tip-in as compared to the tip-out, underestimation of the composite transient exhaust temperature is reduced, improving exhaust temperature control.

From each of 512 and 514, the method proceeds to 516. At 516, it may be determined if the vehicle speed is higher than a threshold speed. In one example, it may be determined if the vehicle speed is higher than 55 mph. If yes, then at 518, to compensate for exhaust pipe and sensor cooling cause by the higher vehicle speed, the controller may increase the ramp-in rate. For example, the controller may increment and clip a transfer function or gain factor (vspd_transient_tmr) associated with the speed transient compensation. Else, if the vehicle speed is lower than the threshold speed, at 520 the controller may decrease the ramp-in rate. For example, the controller may decrement and clip the transfer function or gain factor (vspd_transient_tmr) associated with the speed transient compensation.

From each of 518 and 520, the method proceeds to 522. At 522, it may be determined if the engine run time has exceeded a threshold run duration. In one example, it may be determined if the engine has been running for longer than 300 seconds. If not, the method moves to 524 where it is determined if the engine load is higher than a threshold load. As such, this may be a higher threshold load (Threshold_highload) above which the engine may be determined to be operating in a high load region. In one example, it may be determined if the engine load is higher than 1.4. If the engine load is lower than the threshold load, and the engine is not in the high load region, at 528, the method includes decreasing the ramp-in rate. For example, the controller may decrement a transfer function or gain factor (high_load_transient_tmr) associated with the high load transient compensation. In one example, the transfer function or gain factor may be decremented to zero (that is, the factor is zeroed out) such that no high load compensation is required. Herein, since the basic transfer function of duty cycle to temperature is mapped under medium load conditions, the sensor to gas temperature relationship is gradually restored after the high load event ends. If the engine load is higher than the threshold load, and the engine is determined to be in the high load region, at 526, the method includes increasing the ramp-in rate. For example, the controller may increment the transfer function or gain factor (high_load_transient_tmr) associated with the high load transient compensation. Herein, since the basic transfer function of duty cycle to temperature is mapped under medium load conditions, the increased gas temperature relative to sensor temperature that exists during high load needs to be compensated for.

Upon determining the high load compensation, the method moves to 530. As such, if the engine run time was longer than the threshold duration, the method may move to 530 directly without requiring the high load compensation. Once the exhaust pipe is hot, the sensor is not biased by a cold pipe, so the special high load compensation is no longer required.

In this way, transient compensations are determined that effect the transient adjustment of the heater duty cycle based exhaust temperature as well as the rate of ramping of the transient adjustment. In particular, the rate of ramping is increased as the vehicle speed increases over a threshold speed, the rate of ramping is increased as the engine load increases over a threshold load, the rate of ramping is increased responsive to a transient in the expected exhaust flange temperature (or expected exhaust catalyst brick temperature, as discussed below), and the rate of ramping is decreased responsive to a low load event.

In some examples, such as where the exhaust gas sensor is coupled downstream of the exhaust catalyst, the rate of ramping may be further based on an expected exhaust catalyst brick temperature that is modeled based on engine speed, load, and spark timing.

At 530, the method includes determining or computing the inferred composite transient exhaust temperature based on the heater duty cycle (in particular, the steady-state temperature determined based on the inverse of the heater duty cycle), as well as each of the plurality of learned transient compensations. In particular, for each transient compensation, the controller may determine an absolute amount of compensation as well as a rate of ramping in the compensation (the gain factor). The controller may then learn an integrated or aggregate of the compensations and add this to the heater duty cycle based temperature to infer the composite transient exhaust temperature. For example, the controller may infer the composite transient exhaust temperature as:

$$T\_exh = T\_ss + (\text{flange\_gain} * \text{transient\_ext\_fl}) + \\ (\text{low\_load\_gain} * \text{low\_load\_transient\_tmr}) + \\ (\text{vspd\_gain} * \text{vspd\_transient\_tmr}) + \\ (\text{high\_loadload\_gain} * \text{high\_load\_transient\_tmr})$$

Turning now to FIG. 6, an example diagnostic routine 600 is shown. The method enables early detection of an exotherm (such as from unmetered fuel or air) and early mitigation of overheating.

At 602, the method includes retrieving the composite transient exhaust temperature (T_exh) estimated based on the exhaust gas sensor heater duty cycle and further based on transient vehicle conditions. As such, this is the composite transient exhaust temperature estimated at 424 of FIG. 4-5. At 604, the method includes retrieving a modeled exhaust flange temperature (T_model) estimated based on engine operating conditions such as engine speed, load, air-fuel ratio and spark timing. As such, this is the composite transient exhaust temperature estimated at 410 of FIG. 4.

At 606, the composite transient exhaust temperature may be compared to the modeled exhaust flange temperature and it may be determined if the composite transient exhaust temperature is higher than the modeled exhaust flange temperature. For example, it may be determined if they differ by more than a threshold amount. If yes, then it may be inferred that there is an exotherm due to combustion of fuel at the exhaust catalyst. For example, the exotherm may have resulted from unburned fuel escaping the cylinder and combusting at the exhaust catalyst. In another example, it may be determined that there is an exhaust leak. In still another example, it may be determined that engine operating conditions are generating hotter than expected exhaust.

In response to the determination of an exotherm, at 610, engine operation is adjusted, the adjusting including limiting an engine load to reduce peak exhaust temperatures. In one example, the engine load may be limited to 1.5. For example, the controller may send a signal to an intake throttle actuator to reduce an opening of the intake throttle coupled to the engine's intake passage. As a result, an amount of intake aircharge received in the engine cylinders is reduced, thereby limiting an engine load. In one example, the engine may enter a limited load operation mode to reduce the peak allowed exhaust temperature by 200° C. In addition, the controller may set a diagnostic code responsive to the difference between the composite transient exhaust temperature and the modeled exhaust flange temperature being higher than a threshold amount. The diagnostic code may indicate an accuracy error in the exhaust temperature estimation.

Returning to 606, if the composite transient exhaust temperature is not higher than the modeled exhaust flange temperature (by more than a threshold amount, for example), then at 608, the method compares the modeled exhaust catalyst temperature to a threshold temperature. As such, the threshold temperature in 608 may be based on a temperature above which the life of the catalyst is reduced and may reflect the effect of extended peak power operation. In one example, the threshold temperature is 900° C. If the modeled exhaust flange temperature is not higher than the threshold temperature, then at 614, the method includes clearing any diagnostic codes pertaining the exhaust temperature estimation and allowing an exit from the exhaust catalyst warm-up mode if the modeled catalyst temperature is above the light-off temperature of the exhaust catalyst.

If the modeled catalyst temperature is higher than the threshold temperature, then at 612, the method includes adjusting engine operation to mitigate exhaust overheating and protect the engine from high temperatures. The adjusting may include enriching the engine to reduce peak exhaust temperatures. For example, the controller may send a signal to a fuel injector to increase a pulse width of the injector. As a result, the engine may be operated with a richer than stoichiometry air-fuel ratio. For example, the engine may be operated with an air-fuel ratio of 0.7. The rich operation may be continued for a predefined duration (e.g., a number of combustion events or engine cycles). Alternatively, the enrichment may be continued until the modeled exhaust temperature is lower than a lower threshold temperature. In some example, in addition to enriching the engine, the controller may also limit the engine load. Additionally, the controller may temporarily inhibit entry into a deceleration fuel shut-off (DFSO) mode of operation. For example, even if the engine enters a low load condition where DFSO would be entered, the entry into DFSO is disabled. This is because unburned hydrocarbon at the catalyst will burn at the beginning of the DFSO, spiking the catalyst temperature, especially during enrichment to control the already-hot catalyst temperature. The controller may also set a diagnostic code responsive to the modeled exhaust flange temperature being higher than the threshold temperature. The diagnostic code may indicate an accuracy error in the exhaust temperature estimation. In addition, due to the agreement (or lower difference) between the modeled exhaust flange temperature and the composite transient exhaust temperature (in the preceding step at 606), it may be inferred that the enrichment will provide the desired exhaust cooling.

It will be appreciated that while the methods of FIGS. 4-6 describe the modeled exhaust temperature as a modeled or expected exhaust flange temperature, in alternate examples, the modeled exhaust temperature may include a modeled or expected exhaust catalyst brick temperature. For example, when the heater duty cycle corresponds to the heater of a first, upstream, exhaust gas sensor (e.g., a UEGO sensor), the modeled exhaust temperature may be the expected exhaust flange temperature (since the exhaust flange is immediately upstream of the UEGO sensor). In another example, when the heater duty cycle corresponds to the heater of a second, downstream, exhaust gas sensor (e.g., a CMS sensor), the modeled exhaust temperature may be the expected exhaust catalyst brick temperature (since the exhaust catalyst brick is immediately upstream of the CMS sensor). In both cases, the expected exhaust flange temperature and the expected exhaust catalyst brick temperature may be modeled based on engine operating conditions including at least engine speed, engine load, air-fuel ratio, and spark timing. In still further examples, the routine of FIGS. 4-6 may each be performed separately for the upstream UEGO sensor and the downstream CMS sensor.

Figure 7:
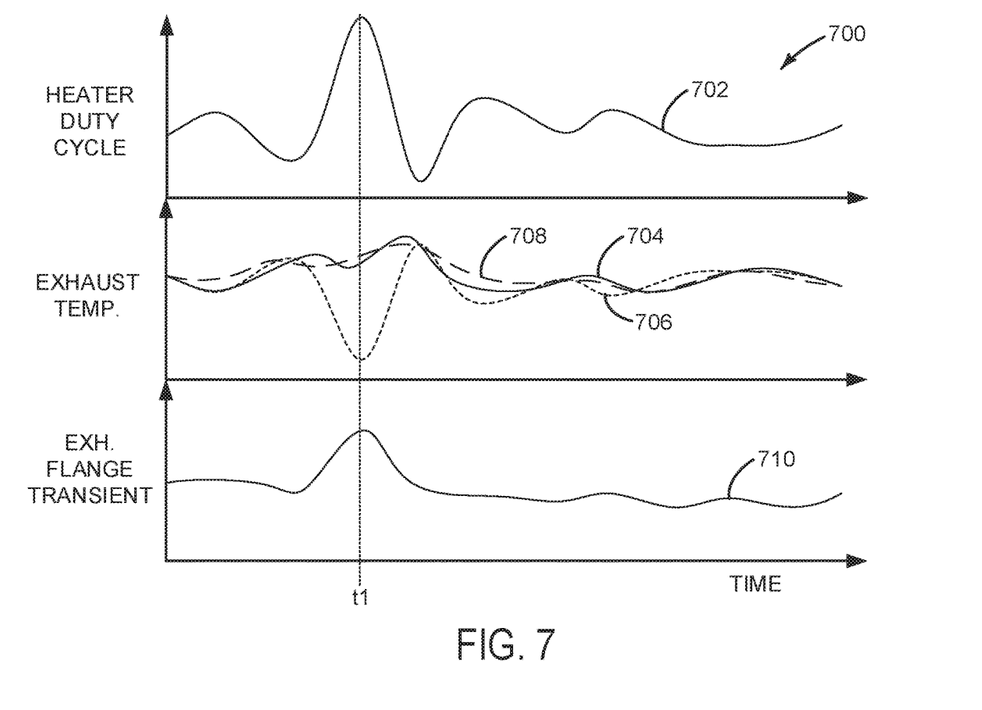
FIGS. 7-10 show example exhaust temperature adjustments and excursions due to varying vehicle conditions during transient vehicle operation.

Example exhaust temperature excursions are now depicted with reference to FIGS. 7-10. FIG. 7 shows a first example of an exhaust temperature excursion at plot 700. In particular, a duty cycle of an exhaust gas sensor heater is shown at plot 702. An excursion in a modeled exhaust flange temperature is shown at plot 710. Exhaust temperature estimated based on the heater duty cycle and compensating for the flange temperature transient is shown at plot 704, and compared to an exhaust temperature estimate without transient compensation (plot 706) as well as an actual temperature estimated by an exhaust temperature sensor (plot 708). All plots are depicted over time of vehicle travel.

In the depicted example, there may be an exhaust flange temperature excursion at t1. For example, there may be a tip-in event at t1. The increase in load results in more exhaust being generated but colder than the sensor. As a result, the duty cycle of the heater may increase. While the exhaust temperature dips transiently, it quickly returns to the higher value, as indicated by the output of the temperature sensor (as shown at large dashed plot 708). However, the duty cycle of the heater returns only when the load decreases and returns to steady-state values. Consequently, if the exhaust temperature is estimated based only on the heater duty cycle and without compensating for the excursion (as shown at small dashed plot 706), the exhaust temperature may be underestimated. By compensating for the dips via a transient compensation, the inferred composite transient exhaust temperature (shown by solid line plot 704) is able to better match the value estimated by the temperature sensor. In particular, by adding in the transient value of the inferred exhaust flange temperature, large dips can be removed. For example rising transients can be used to compensate for the large dips. As a result, the magnitude of the error is reduced.

Figure 8:
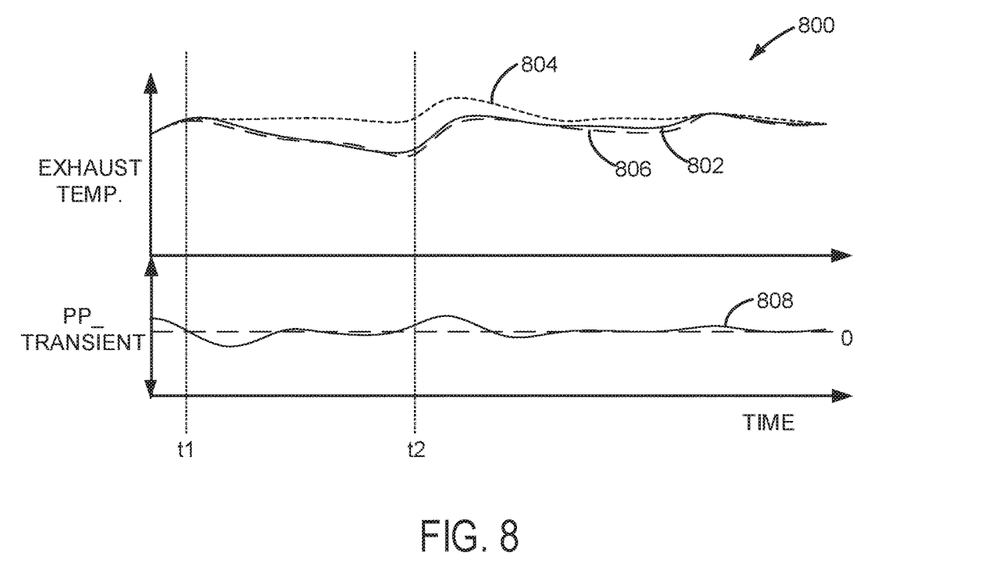

FIG. 8 shows another example of an exhaust temperature excursion at plot 800. Therein, a transient in the exhaust flange temperature resulting from a operation at low load (low_load_compensation) is shown at plot 808. Exhaust temperature estimated based on the heater duty cycle and compensating for the flange temperature transient is shown at plot 802, and compared to an exhaust temperature estimate without transient compensation (plot 804) as well as an actual temperature estimated by an exhaust temperature sensor (plot 806). All plots are depicted over time of vehicle travel.

In the depicted example, periods of low load operation are provided with an additional compensation. As such, this may constitute a low load compensation. For example, there may be extended tip-out (e.g., extended idle condition) between t1 and t2. The unadjusted exhaust temperature estimate based on only on the heater duty cycle (small dashed line 804) does not track the down-going direction of the temperature sensor based temperature (large dashed line 806). To reduce the error, the compensation ramps in a transient reduction in exhaust temperature whenever the load is below a threshold and ramps out the transient reduction in exhaust temperature whenever the load is above the threshold. For example, the controller may ramp in the transient leading to a 1 degree Celsius per second subtraction of the exhaust temperature that is based on the heater duty cycle when the load is higher than 0.6 for 200 ms (or 5 degree Celsius per second subtraction of the exhaust temperature that is based on the heater duty cycle when the load is higher than 0.6 for 1 s). The transient may be ramped out when the load is below 0.6. In other words, the controller uses a different multiplier for positive flange transients versus negative flange transients.

Figure 9:
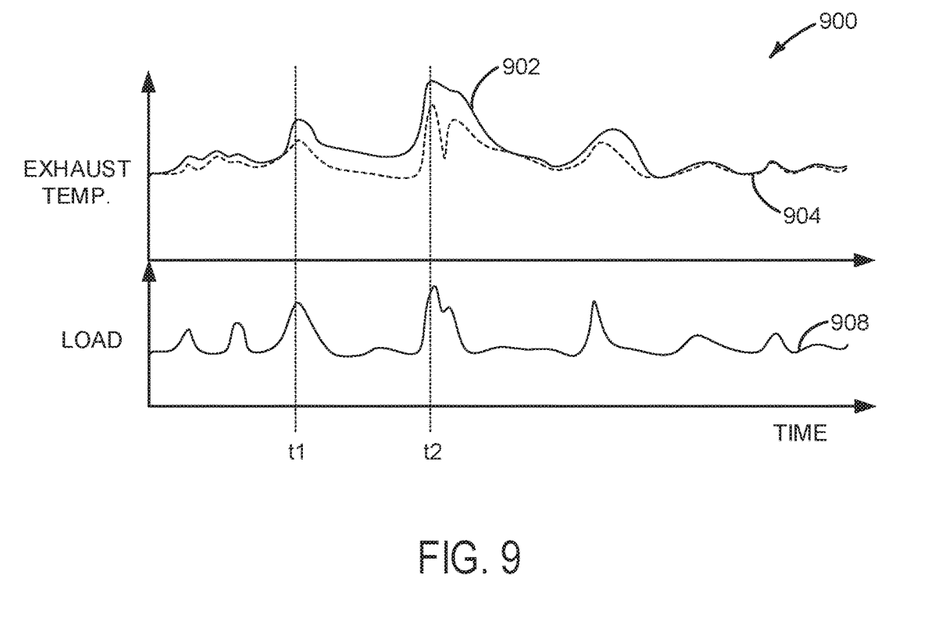

FIG. 9 shows yet another example of an exhaust temperature excursion at plot 900. Therein, transients in the exhaust flange temperature resulting from a change in engine load (shown at plot 908) are compensated for. Exhaust temperature estimated based on the heater duty cycle and compensating for the flange temperature transient is shown at plot 902, and compared to an exhaust temperature estimate without transient compensation (plot 904). All plots are depicted over time of vehicle travel.

In the depicted example, there may be intermittent tip-ins, with some tips-ins being large tip-ins. For example, there may be large tip-ins to loads higher than 1.4, such as shown at t1 and t2. The large tip-ins are provided with an additional compensation. As such, this may constitute a high load compensation. Herein, at higher loads, the exhaust actually gets hotter than the unadjusted exhaust temperature estimate would predict. The unadjusted exhaust temperature estimate based on only on the heater duty cycle (small dashed line 904) does not track the up-going direction of a temperature sensor based temperature (not shown). In other words, the unadjusted temperature would undershoot the actual temperature. To reduce the error, the compensation ramps in a transient increase in exhaust temperature whenever the load is above a threshold and ramps out the transient increase in exhaust temperature whenever the load is below the threshold. For example, the controller may ramp in the transient leading to a 10 degree Celsius per second increase of the exhaust temperature that is based on the heater duty cycle for every second of engine operation at a load higher than 1.4. The transient may be ramped out when the load is below 1.4. In other words, the controller uses a different multiplier for positive flange transients versus negative flange transients.

Figure 10:
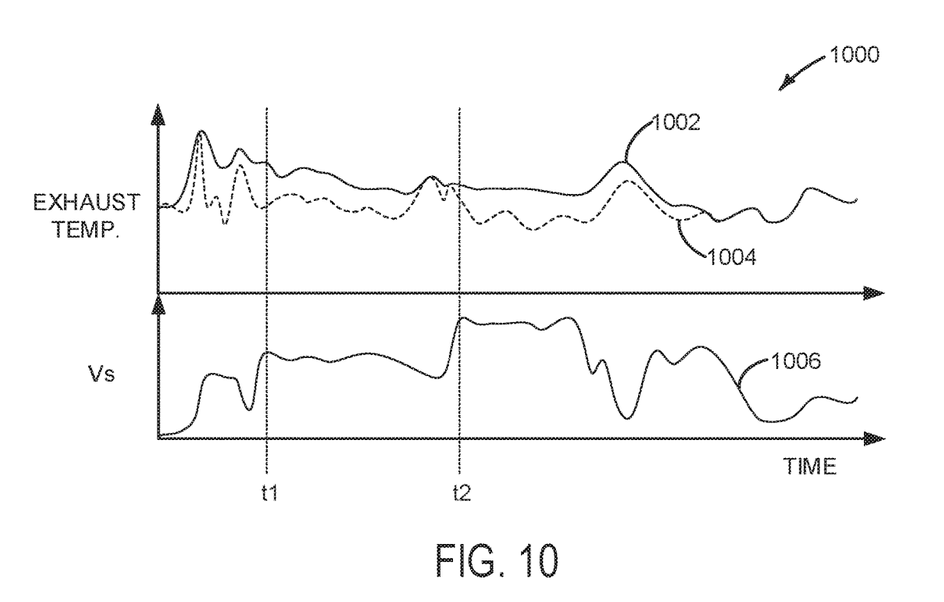

FIG. 10 shows still another example of an exhaust temperature excursion at plot 1000. Therein, transients in the exhaust flange temperature resulting from a change in vehicle speed (shown at plot 1006) are compensated for. Exhaust temperature estimated based on the heater duty cycle and compensating for the flange temperature transient is shown at plot 1002, and compared to an exhaust temperature estimate without transient compensation (plot 1004). All plots are depicted over time of vehicle travel.

In the depicted example, there may be spikes in vehicle speed, and extended vehicle operation at the higher speed. For example, there may segments of vehicle operation at or above 55 mph, as shown at t1 and t2. The higher vehicle speeds are provided with an additional compensation. As such, this may constitute a vehicle speed compensation. Herein, at higher vehicle speeds, the exhaust pipe gets cooler than the exhaust. The increased heat loss from the UEGO to the air-cooled exhaust pipe causes the heater to work harder. As a result, the heater duty cycle increases and the unadjusted exhaust temperature estimate would predict a higher exhaust temperature than is actually present. The unadjusted exhaust temperature estimate based on only on the heater duty cycle (small dashed line 1004) does not track the up-going direction of a temperature sensor based temperature (not shown). In other words, the unadjusted temperature would undershoot the actual temperature. To reduce the error, the compensation ramps in a transient increase in exhaust temperature whenever the vehicle speed is above a threshold speed and ramps out the transient increase in exhaust temperature whenever the vehicle speed is below the threshold speed. For example, the controller may ramp in the transient leading to a 2.5 degree Celsius increase of the exhaust temperature that is based on the heater duty cycle for every second of vehicle operation at a speed higher than 55 mph. The transient may be ramped out when the speed is below 55 mph.

It will be appreciated that FIGS. 7-10 depict the various transient compensations parsed out. However, the controller may perform one or more of the various compensations concurrently based on changes in vehicle conditions to more accurately reflect the exhaust temperature.

In this way, an exhaust temperature may be accurately measured using the heater of an existing exhaust gas oxygen sensor while better compensating for expected excursions in temperature. The technical result is that existing sensors can be leveraged for additional measurements. In addition, even if an exhaust temperature sensor is present in the engine system, the modeled exhaust temperature can be confirmed or corrected based on the output of the sensor. By compensating for excursions in exhaust temperature resulting from changes in vehicle conditions during vehicle operation, a more reliable exhaust temperature estimate may be determined. As such, this allows exhaust exotherms to be identified more promptly, enabling mitigating actions to be timely performed. Consequently, exhaust component degradation is reduced.

One example method for a vehicle engine comprises: inferring a composite transient exhaust temperature based on a duty cycle of an exhaust gas sensor heating element and further based on vehicle conditions during transient vehicle operation, the vehicle conditions including engine load, vehicle speed, and modeled exhaust flange temperature or modeled catalyst temperature; and adjusting engine operation based on the composite transient exhaust temperature. In the preceding example, additionally or optionally, the method further comprises adjusting the duty cycle of the exhaust gas sensor heating element based on an error between a desired exhaust gas sensor temperature and an actual exhaust gas sensor temperature. In any or all of the preceding examples, additionally or optionally, the exhaust gas sensor is one or more of a first exhaust gas oxygen sensor coupled upstream of an exhaust catalyst and a second exhaust gas oxygen sensor coupled downstream of the exhaust catalyst. In any or all of the preceding examples, additionally or optionally, the inferring includes converting an inverse of the duty cycle into a first exhaust temperature estimate via a transfer function, and then ramping in a transient adjustment, each of the transient adjustment and a rate of the ramping in based on the engine load, the vehicle speed, and the modeled exhaust flange temperature or modeled catalyst temperature, and wherein the adjusting the duty cycle of the exhaust gas sensor heating element based on the error is continued during the ramping. In any or all of the preceding examples, additionally or optionally, the exhaust flange temperature includes an expected exhaust flange temperature modeled based on each of engine speed, engine load, air-fuel ratio and spark ignition timing. In any or all of the preceding examples, additionally or optionally, the rate of ramping is decreased as the vehicle speed increases over a threshold speed, wherein the rate of ramping is increased as the engine load increases over a threshold load, and wherein the rate of ramping is decreased responsive to a transient in the expected exhaust flange temperature. In any or all of the preceding examples, additionally or optionally, the rate of ramping is further based on an high load event or an low load event. In any or all of the preceding examples, additionally or optionally, the rate of ramping is increased responsive to the operator high load event and decreased responsive to the low load event. In any or all of the preceding examples, additionally or optionally the method further comprises setting a diagnostic code responsive to a difference between the expected exhaust flange temperature and the composite transient exhaust temperature being higher than a threshold amount. In any or all of the preceding examples, additionally or optionally, the vehicle includes a grill shutter system coupled to a front end of the vehicle, and wherein the rate of ramping is further based on whether the grill shutter system is open or closed, the rate of ramping increased when the grill shutters are open, the rate of ramping decreased when the grill shutters are closed. In any or all of the preceding examples, additionally or optionally, when the exhaust gas sensor is the second exhaust gas sensor coupled downstream of the exhaust catalyst, the rate of ramping is further based on an expected exhaust catalyst brick temperature modeled based on each of engine speed, engine load, and spark ignition timing. In any or all of the preceding examples, additionally or optionally, the adjusting includes one or more of limiting an engine load and operating the engine with a richer than stoichiometry air-fuel ratio responsive to the composite transient exhaust temperature being higher than a threshold.

Another example method for a vehicle engine comprises inferring a steady-state exhaust temperature based on a duty cycle of a heater coupled to an exhaust gas sensor; estimating a composite transient exhaust temperature by ramping the steady-state exhaust temperature based on each of a change in engine load, vehicle speed, and modeled exhaust temperature during transient vehicle operation. In the preceding example, additionally or optionally, the inferring includes during a first condition, inferring based on the duty cycle of a first heater coupled to a first exhaust gas sensor located upstream of an exhaust catalyst, during a second condition, inferring based on the duty cycle of a second heater coupled to a second exhaust gas sensor located downstream of the exhaust catalyst. In any or all of the preceding examples, additionally or optionally, during the first condition, the modeled exhaust temperature includes a modeled exhaust flange temperature, wherein during the second condition, the modeled exhaust temperature includes a modeled exhaust catalyst brick temperature, and wherein during the third condition, the modeled temperature includes each of the modeled exhaust flange temperature and the modeled exhaust catalyst brick temperature. In any or all of the preceding examples, additionally or optionally, the inferring includes converting an inverse of the duty cycle of the heater into the steady-state temperature using a transfer function, and wherein the estimating includes setting a ramping rate based on each of the change in load, vehicle speed, and modeled exhaust temperature. In any or all of the preceding examples, additionally or optionally the method further comprises adjusting an engine operating parameter based on the composite transient exhaust temperature, the engine operating parameter including one or more a fuel injection amount and an engine intake aircharge amount. In any or all of the preceding examples, additionally or optionally the method further comprises modeling the modeled exhaust temperature based on each of engine speed, engine load, air-fuel ratio and spark timing; in response to a difference between the modeled exhaust temperature and the composite transient exhaust temperature being higher than a threshold amount, limiting an intake aircharge amount to limit the engine load; and in response to the modeled exhaust temperature being higher than a threshold temperature, enriching the engine and setting a diagnostic code.

Another example vehicle system comprises an engine including an intake passage and an exhaust passage; an exhaust catalyst coupled to the engine exhaust passage; an exhaust gas oxygen sensor coupled upstream of the exhaust catalyst, the sensor including a heater for maintaining the sensor at an operating temperature; a fuel injector coupled to an engine cylinder; an intake throttle coupled to the engine intake passage; and a controller. The controller may be configured with computer readable instructions stored on non-transitory memory for, during vehicle operation, capturing a duty cycle of the heater; converting an inverse of the duty cycle into a first exhaust temperature estimate; learning a transfer function based on transients during the vehicle operation; calculating a second exhaust temperature estimate based on the first exhaust temperature estimate and the learned transfer function; and adjusting engine operation based on the second exhaust temperature estimate. In the preceding example, additionally or optionally, during vehicle operation includes during steady-state and transient vehicle operation, and learning a transfer function based on transients during the vehicle operation includes learning the transfer function based on one or more of a change in vehicle speed, a change in engine load, and a change in accelerator pedal position during the transient vehicle operation. In any or all of the preceding examples, additionally or optionally the controller includes further instructions for indicating exhaust over-temperature conditions in response to the second exhaust temperature being higher than a threshold, the modeled second exhaust temperature based on engine speed, engine load, and spark timing; and in response to the indicating, reducing an opening of the intake throttle to limit the engine load and enriching the engine. In any or all of the preceding examples, additionally or optionally the controller includes further instructions for indicating exhaust model inaccuracy conditions in response to a difference between the second exhaust temperature and a modeled exhaust temperature being higher than a threshold, the modeled exhaust temperature based on engine speed, engine load, air-fuel ratio and spark timing, and in response to the indicating, reducing an opening of the intake throttle to limit the engine load and enriching the engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled in a vehicle, comprising:
inferring a composite transient exhaust temperature based on a duty cycle of an exhaust gas sensor heater and further based on vehicle conditions during transient vehicle operation, the vehicle conditions including engine load, vehicle speed, and exhaust flange temperature; and
adjusting engine operation based on the composite transient exhaust temperature.

2. The method of claim 1, further comprising adjusting the duty cycle of the exhaust gas sensor heater based on an error between a desired exhaust gas sensor temperature and an actual exhaust gas sensor temperature.

3. The method of claim 2, wherein the heater is coupled to an exhaust gas sensor, and wherein the exhaust gas sensor is one or more of a first exhaust gas oxygen sensor coupled upstream of an exhaust catalyst and a second exhaust gas oxygen sensor coupled downstream of the exhaust catalyst.

4. The method of claim 3, wherein the inferring includes converting an inverse of the duty cycle into a first exhaust temperature estimate via a transfer function, and then ramping in a transient adjustment, each of the transient adjustment and a rate of the ramping is based on the engine load, the vehicle speed, and the exhaust flange temperature, and wherein the adjusting the duty cycle of the exhaust gas sensor heater based on the error is continued during the ramping.

5. The method of claim 4, wherein the exhaust flange temperature includes an expected exhaust flange temperature modeled based on each of engine speed, engine load, air-fuel ratio, and spark ignition timing.

6. The method of claim 5, wherein the rate of the ramping is increased as the vehicle speed increases over a threshold speed, wherein the rate of the ramping is increased as the engine load increases over a threshold load, wherein the rate of the ramping is decreased as the engine load decreases below a second threshold load and wherein the rate of the ramping is decreased responsive to a transient in the expected exhaust flange temperature.

7. The method of claim 5, wherein the rate of the ramping is further based on an operator pedal tip-in event or an operator pedal tip-out event, the rate of the ramping increased responsive to the operator pedal tip-out event and decreased responsive to the operator pedal tip-in event.

8. The method of claim 5, further comprising setting a diagnostic code responsive to a difference between the expected exhaust flange temperature and the composite transient exhaust temperature being higher than a threshold amount.

9. The method of claim 4, wherein the vehicle includes grill shutters coupled to a front end of the vehicle, and wherein the rate of ramping is further based on whether the grill shutters are open or closed, the rate of ramping increased when the grill shutters are open, the rate of ramping decreased when the grill shutters are closed.

10. The method of claim 4, wherein when the exhaust gas sensor is the second exhaust gas oxygen sensor coupled downstream of the exhaust catalyst, the rate of ramping is further based on an expected exhaust catalyst brick temperature modeled based on each of engine speed, engine load, and spark ignition timing.

11. The method of claim 1, wherein the adjusting includes one or more of limiting an engine load and operating the engine with a richer than stoichiometric air-fuel ratio responsive to the composite transient exhaust temperature being higher than a threshold.

12. A method for a vehicle engine, comprising:
inferring a steady-state exhaust temperature based on a duty cycle of a heater coupled to an exhaust gas sensor;
estimating a composite transient exhaust temperature by ramping the steady-state exhaust temperature based on each of a change in engine load, vehicle speed, and modeled exhaust temperature during transient vehicle operation; and
adjusting an engine operating parameter based on the composite transient exhaust temperature, the engine operating parameter including one or more of a fuel injection amount and an engine intake aircharge amount.

13. The method of claim 12, wherein the heater coupled to the exhaust gas sensor includes a first heater coupled to a first exhaust gas sensor located upstream of an exhaust catalyst and a second heater coupled to a second exhaust gas sensor located downstream of the exhaust catalyst and wherein the inferring includes, during a first condition, inferring based on the duty cycle of the first heater coupled to the first exhaust gas sensor, and during a second condition, inferring based on the duty cycle of the second heater coupled to the second exhaust gas sensor.

14. The method of claim 13, wherein during the first condition, the modeled exhaust temperature includes a modeled exhaust flange temperature, wherein during the second condition, the modeled exhaust temperature includes a modeled exhaust catalyst brick temperature, and wherein during a third condition, the modeled exhaust temperature includes each of the modeled exhaust flange temperature and the modeled exhaust catalyst brick temperature.

15. The method of claim 12, wherein the inferring includes converting an inverse of the duty cycle of the heater into the steady-state exhaust temperature using a transfer function, and wherein the estimating includes setting a ramping rate based on each of the change in engine load, vehicle speed, and modeled exhaust temperature.

16. The method of claim 12, further comprising modeling the modeled exhaust temperature based on each of engine speed, engine load, air-fuel ratio, and spark timing; in response to a difference between the modeled exhaust temperature and the composite transient exhaust temperature being higher than a threshold amount, limiting an intake aircharge amount to limit the engine load; and in response to the modeled exhaust temperature being higher than a threshold temperature, enriching the engine and setting a diagnostic code.

* * * * *